(12) United States Patent
Vogler et al.

(10) Patent No.: US 9,908,286 B2
(45) Date of Patent: Mar. 6, 2018

(54) SONOTRODE WITH THICKENED PORTION

(71) Applicant: Herrmann Ultraschalltechnik GmbH & Co. KG, Karlsbad (DE)

(72) Inventors: Ulrich Vogler, Uhldingen-Muhlhofen (DE); Stefan Zendler, Straubenhardt (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 24 days.

(21) Appl. No.: 15/112,398

(22) PCT Filed: Feb. 5, 2015

(86) PCT No.: PCT/EP2015/052427
§ 371 (c)(1),
(2) Date: Jul. 18, 2016

(87) PCT Pub. No.: WO2015/121149
PCT Pub. Date: Aug. 20, 2015

(65) Prior Publication Data
US 2016/0332362 A1      Nov. 17, 2016

(30) Foreign Application Priority Data

Feb. 13, 2014   (DE) .................. 10 2014 101 856

(51) Int. Cl.
*B32B 37/00*      (2006.01)
*B29C 65/08*      (2006.01)
(Continued)

(52) U.S. Cl.
CPC .............. *B29C 65/087* (2013.01); *B06B 3/00* (2013.01); *B29C 66/1122* (2013.01);
(Continued)

(58) Field of Classification Search
CPC ... B29C 65/08; B29C 65/087; B29C 66/1122; B29C 66/43; B29C 66/81427; B29C 66/83413; B29C 66/9592; B06B 3/00
(Continued)

(56) References Cited

U.S. PATENT DOCUMENTS 5,697,035 A   12/1997   Mahtare
5,707,483 A   1/1998   Nayar
(Continued)

FOREIGN PATENT DOCUMENTS

CA   2 041 018 C   7/2000
CN   1716769 A   1/2006
(Continued)

OTHER PUBLICATIONS

The State Intellectual Property Office of the People's Republic of China, Appln. 201580008006.6, Office Action, dated May 2, 2017, and English translation.
(Continued)

*Primary Examiner* — James Sells
(74) *Attorney, Agent, or Firm* — Paul & Paul

(57) ABSTRACT

The present invention concerns A sonotrode with a wheel-shaped portion having a wheel axis and of a diameter d, which has two substantially circular main surfaces and a substantially cylindrical sealing surface of the width b, that connects the main surfaces. To provide a corresponding sonotrode in which the triangular frequency differs markedly from the main frequency it is proposed according to the invention that at least one main surface has a non-central thickened portion which in a sectional view perpendicularly to the main surface has a convex region which is not arranged on the wheel axis.

15 Claims, 8 Drawing Sheets

(51) Int. Cl.
*B06B 3/00* (2006.01)
*B29C 65/00* (2006.01)

(52) U.S. Cl.
CPC ........ *B29C 66/43* (2013.01); *B29C 66/81427* (2013.01); *B29C 66/83413* (2013.01); *B29C 66/9592* (2013.01)

(58) Field of Classification Search
USPC .......................................... 156/580.1, 580.2
See application file for complete search history.

(56) References Cited

U.S. PATENT DOCUMENTS

| | | | |
|---|---|---|---|
| 6,966,969 | B2 | 11/2005 | Aplix |
| 8,899,295 | B2 | 12/2014 | Vogler |
| 2005/0285700 | A1 | 12/2005 | Koga et al. |
| 2006/0144906 | A1 | 7/2006 | Sheehan |
| 2007/0144678 | A1* | 6/2007 | Van Eperen ...... A61F 13/15723 156/530 |
| 2007/0251978 | A1 | 11/2007 | Konieczka |
| 2009/0032198 | A1* | 2/2009 | Sorensen ................ B06B 3/00 156/580.2 |
| 2010/0040903 | A1 | 2/2010 | Kalt |
| 2010/0212470 | A1 | 8/2010 | Ohnishi |
| 2011/0042014 | A1* | 2/2011 | Vogler ................ B23K 20/106 156/580.1 |
| 2011/0220292 | A1* | 9/2011 | Short ................... B23K 20/103 156/580.1 |

FOREIGN PATENT DOCUMENTS

| | | |
|---|---|---|
| CN | 2772709 Y | 4/2006 |
| DE | 77 07 983 U1 | 9/1978 |
| DE | 691 33 337 T2 | 7/2004 |
| DE | 20 2005 016 252 U1 | 12/2006 |
| DE | 10 2008 002 744 A1 | 12/2009 |
| EP | 0 457 187 A2 | 11/1991 |
| EP | 1849583 A2 | 10/2007 |
| GB | 1 524 924 A1 | 9/1978 |
| JP | 2003-535715 | 12/2003 |
| WO | 0194099 | 12/2001 |
| WO | 2004/060581 A1 | 7/2004 |

OTHER PUBLICATIONS

Nora Lindner, International Bureau of the World Intellectual Property Organization, English Translation of International Preliminary Report on Patentability, PCT/EP2015/052427, dated Aug. 18, 2016.
Takashi Kuroishi, Japanese Patent Office, Application No. 2016-549771, Office Action, dated Oct. 16, 2017, and English translation.

\* cited by examiner

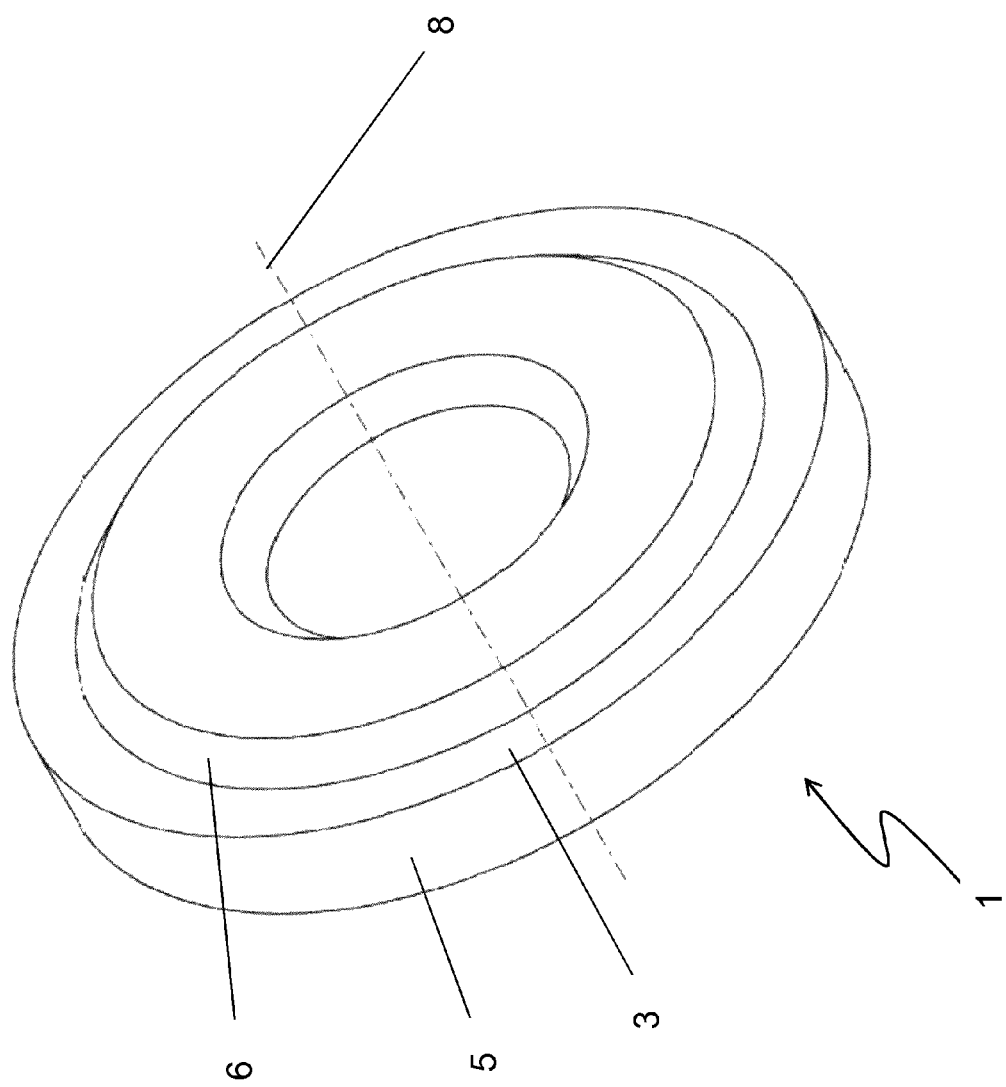

SONOTRODE WITH THICKENED PORTION

CROSS-REFERENCE TO RELATED APPLICATION

This application is a 371 national stage application of International Application PCT/EP2015/052427, filed Feb. 5, 2015, and claims the priority of German Application No. 10 2014 101 856.7, filed on Feb. 13, 2014.

The present invention concerns a sonotrode with a wheel-shaped portion having a wheel axis and of a diameter d, which has two substantially circular main surfaces and a substantially cylindrical sealing surface of the width b, that connects the main surfaces.

Figure 1:
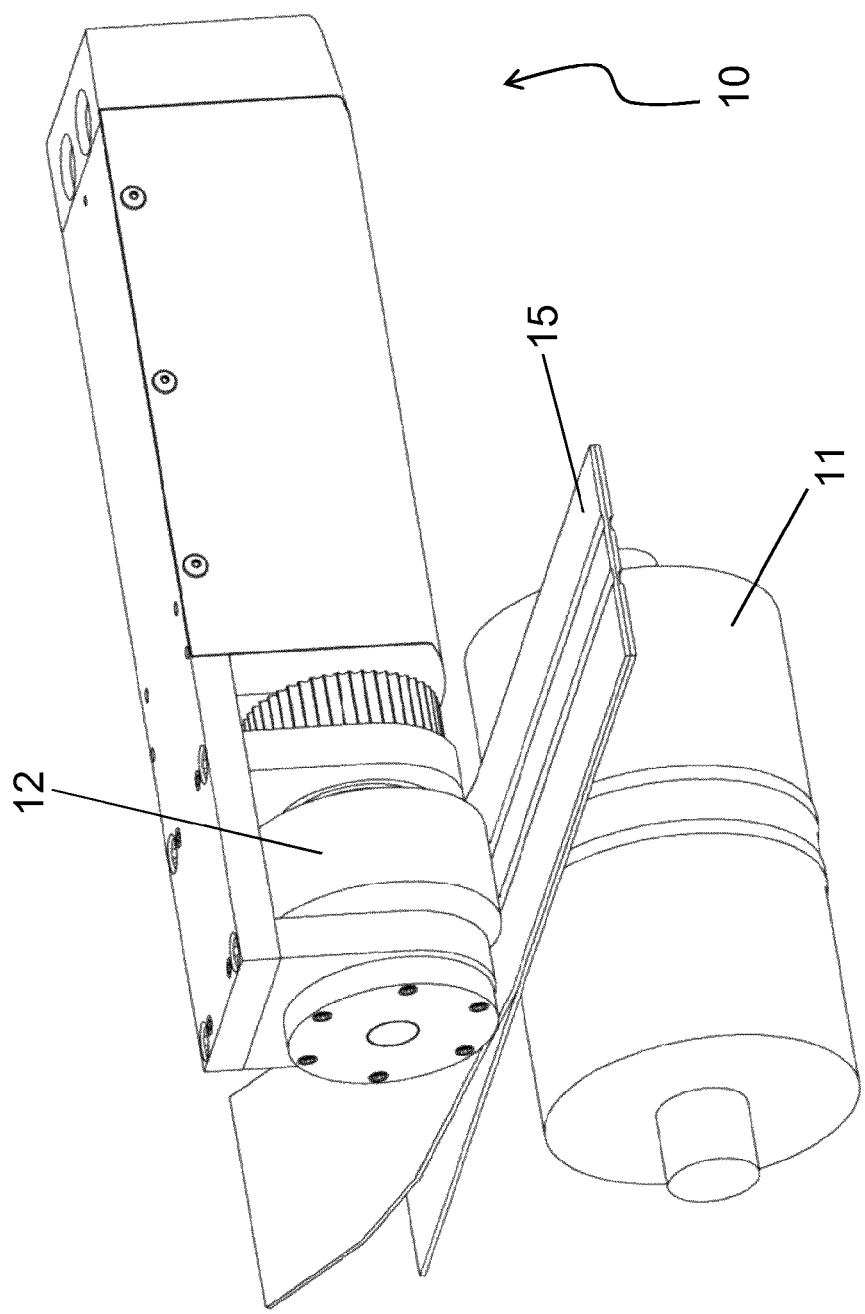

Such sonotrodes are known. They are used for example for the continuous ultrasonic processing of material webs. FIG. 1 diagrammatically shows such an ultrasonic processing machine 10.

A radial vibration is impressed on the sonotrode 12 and during the processing operation it is rotated about its wheel axis so that the peripheral speed is the same as the web feed speed.

During the material processing operation the sonotrode 12 cooperates with an oppositely disposed counterpart tool 11 so that the material webs 15 to be processed are moved through between the counterpart tool 11 on the one hand and the sonotrode 12 on the other hand. In that case a welding force is generally applied to the material 15 to be processed, with the sonotrode 12 and the counterpart tool 11. The material 15 comes into contact with the cylindrical sealing surface of the width b and is acted upon with ultrasound. The cylindrical sealing surface and/or the corresponding sealing surface of the counterpart tool can be of a structured configuration, that is to say there can be provided a plurality of projections which provide for structuring of the material to be processed.

To achieve ultrasonic processing which is as optimum as possible a standing cylindrical wave is induced in the sonotrode, that is to say the sonotrode has a resonance frequency at which a standing cylindrical wave is produced in the sonotrode so that the vibration maximum of the standing wave is on the sealing surface. In other words, when the sonotrode is excited with that resonance frequency the sonotrode vibrates in such a way that the substantially cylindrical sealing surface vibrates at an ultrasonic frequency in the radial direction so that the sealing surface reciprocates between a position of larger diameter and a position of smaller diameter. The ultrasonic vibration is propagated perpendicularly to the wheel axis in the radial direction.

That standing radial vibration is the main frequency (HF) for that kind of sonotrode. It is induced and used for effective ultrasonic processing.

It will be noted however that there are also further resonances which do not lead to desired vibration states.

Figure 2:
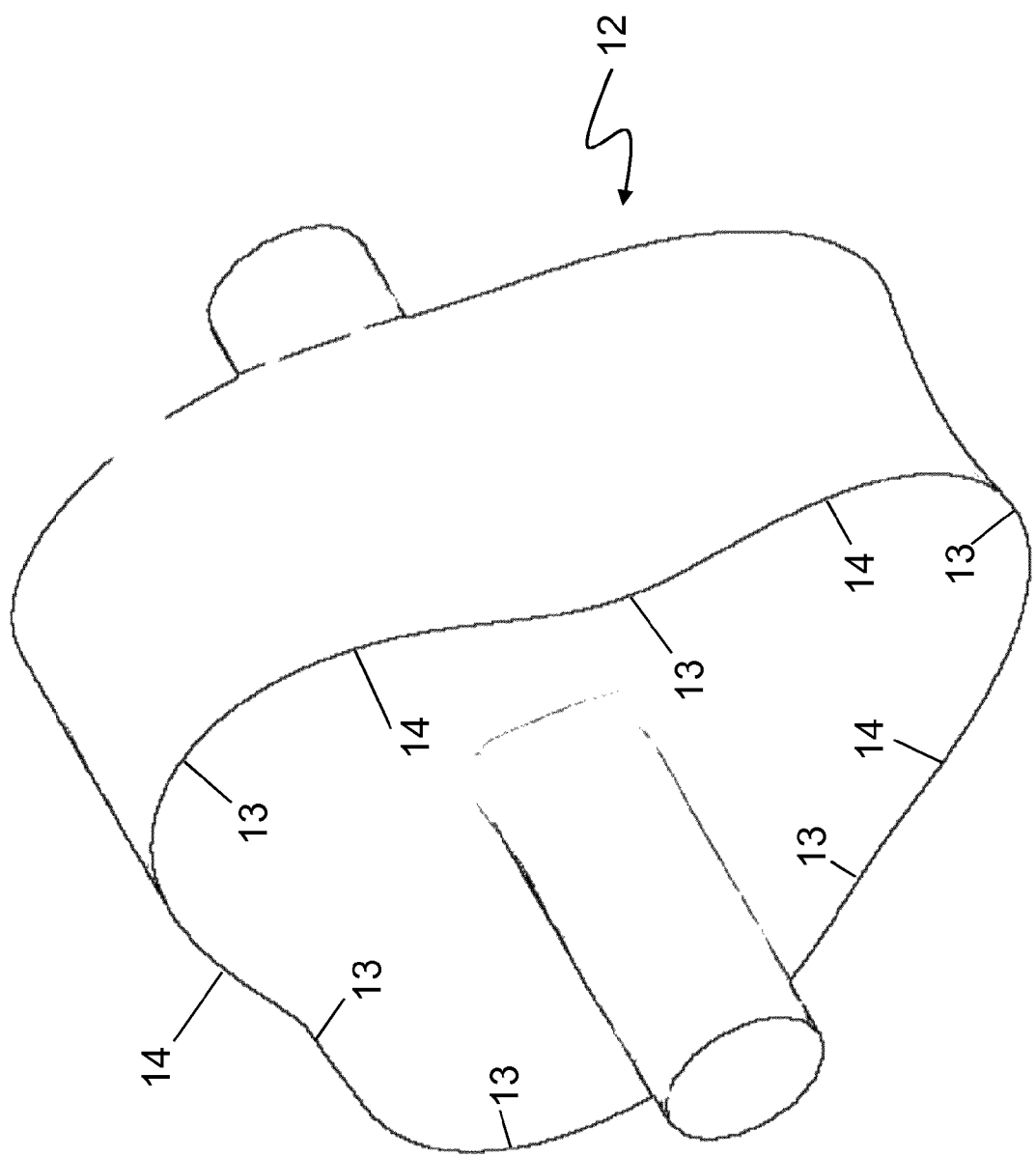

Thus it is for example possible to induce the so-called triangular frequency (DF) at which a standing wave with six vibration nodes and six vibration maxima is produced in the peripheral direction on the sealing surface. FIG. 2 shows a diagrammatic view of that vibration mode. When the triangular frequency is induced the wheel-shaped sonotrode 12 is deformed by the vibration maxima identified by reference 13 reciprocating between a radially further inwardly disposed position and a radially further outwardly disposed position, in such a way that adjacent vibration maxima vibrate in opposite relationship, that is to say when a point is at its radially further inwardly disposed position then both adjacent points are at their radially further outwardly disposed positions. There is a vibration node 14 at which the welding surface performs almost no movement in the radial direction, between two respective vibration maxima 13. That vibration mode has been described for example in WO 2004/060581.

That vibration is unwanted for the ultrasonic processing of materials as it leads to non-homogenous transfer of energy at the sealing surface as much less energy is transferred in the radial direction in the region of the vibration nodes than in the region of the vibration maxima. Nonetheless it is not possible to completely avoid the triangular frequency also being induced and as a result a vibration state is produced, characterised by a superimpositioning of the main vibration and the triangular vibration. With that superimposed vibration state too the vibration amplitude varies in the peripheral direction so that the welding result is worse than upon inducement exclusively of the main frequency.

To keep the inducement of the triangular mode down it is therefore advantageous if the natural frequency of the triangular mode is removed as far as possible from the natural frequency of the main mode that is actually wanted. If more specifically the triangular frequency is also excited then that leads not only to an irregular transfer of ultrasonic energy but—by virtue of coupling which cannot be avoided between the excitation modes—it also results in vibration frequencies in the audible range. More specifically coupling of the modes leads to a vibration whose frequency is determined by the difference between the main frequency and the triangular frequency. If that is in the audible range an unwanted sound can be produced during the ultrasonic processing operation, and that possibly results in increased demands in terms of protecting hearing.

EP 0 457 187 A2 shows a plurality of different sonotrodes. FIG. 13 of EP 0 457 187 A2 shows a sonotrode having a wheel-shaped portion and a wedge-shaped sealing surface. The main surfaces of that sonotrode are concave.

Therefore the object of the present invention is to provide a sonotrode in which the triangular frequency differs markedly from the main frequency. It has been found that when exciting the main frequency there is a stronger coupling in relation to the triangular frequency if the triangular frequency is lower than the main frequency. If in contrast the triangular frequency is higher than the main frequency the coupling is markedly less. The aim therefore is a sonotrode in which the triangular frequency is as much higher as possible than the main frequency.

According to the invention that object is attained in that at least one main surface of the sonotrode has a non-central thickened portion which in a sectional view perpendicularly to the main surface has a convex region which is not arranged on the wheel axis.

The term convex region is used to denote a region which either has a surface projecting beyond the main surface or an outwardly curved portion. In other words, the term convex region is used to denote a region in which, between two points on the boundary surface, there is a boundary surface point which lies outside the connecting line between the two points.

That thickened portion is not central, that is to say it is not arranged centrally relative to the wheel axis.

More specifically extensive tests have shown that the provision of a thickened portion outside the wheel axis influences the natural frequency of the triangular mode more greatly than the natural frequency of the main mode. Thus the difference between the triangular frequency and the main frequency can be increased by that measure.

In a preferred embodiment the thickened portion has an apex point or an apex surface to which a tangent extends perpendicularly to the axis. In that case preferably the apex point or surface is arranged spaced from the sealing surface.

Admittedly it is basically possible for the thickened portion to be only of a section-wise configuration in the peripheral direction, but the greatest effects are achieved if the thickened portion is of a rotationally symmetrical configuration relative to the wheel axis. In other words at least one main surface has a substantially annular thickened portion.

In a particularly preferred embodiment the thickened portion is arranged spaced from the wheel axis at at least 0.1×d and preferably at least 0.15×d. Tests have shown however that the arrangement of the thickened portion should not be arranged too closely to the wheel axis as otherwise the main frequency is influenced by the arrangement of the thickened portion, which however is not desired.

In a further preferred embodiment it is provided that the thickened portion is arranged spaced from the sealing surface at at least 0.05×d and preferably at least 0.17×d. Tests have shown that the thickened portion should not be arranged too closely to the sealing surface in order to produce an effect according to the invention which is as pronounced as possible.

In a further preferred embodiment it is provided that in the radial direction the thickened portion is of an extent c of at least 0.1×d, particularly preferably at least 0.2×d and best between 0.2×d and 0.25×d.

For example in the radial direction the thickened portion could be of an extent c of at least 18 mm, particularly preferably at least 22 mm and best between 22 and 30 mm.

In a further preferred embodiment in the axial direction the thickened portion is of an extent a which is between 0.25×b and 2×b and preferably between 0.25×b and 1×b.

For example the thickened portion in the axial direction could be of an extent which is between 2 mm and 10 mm.

Figure 3:
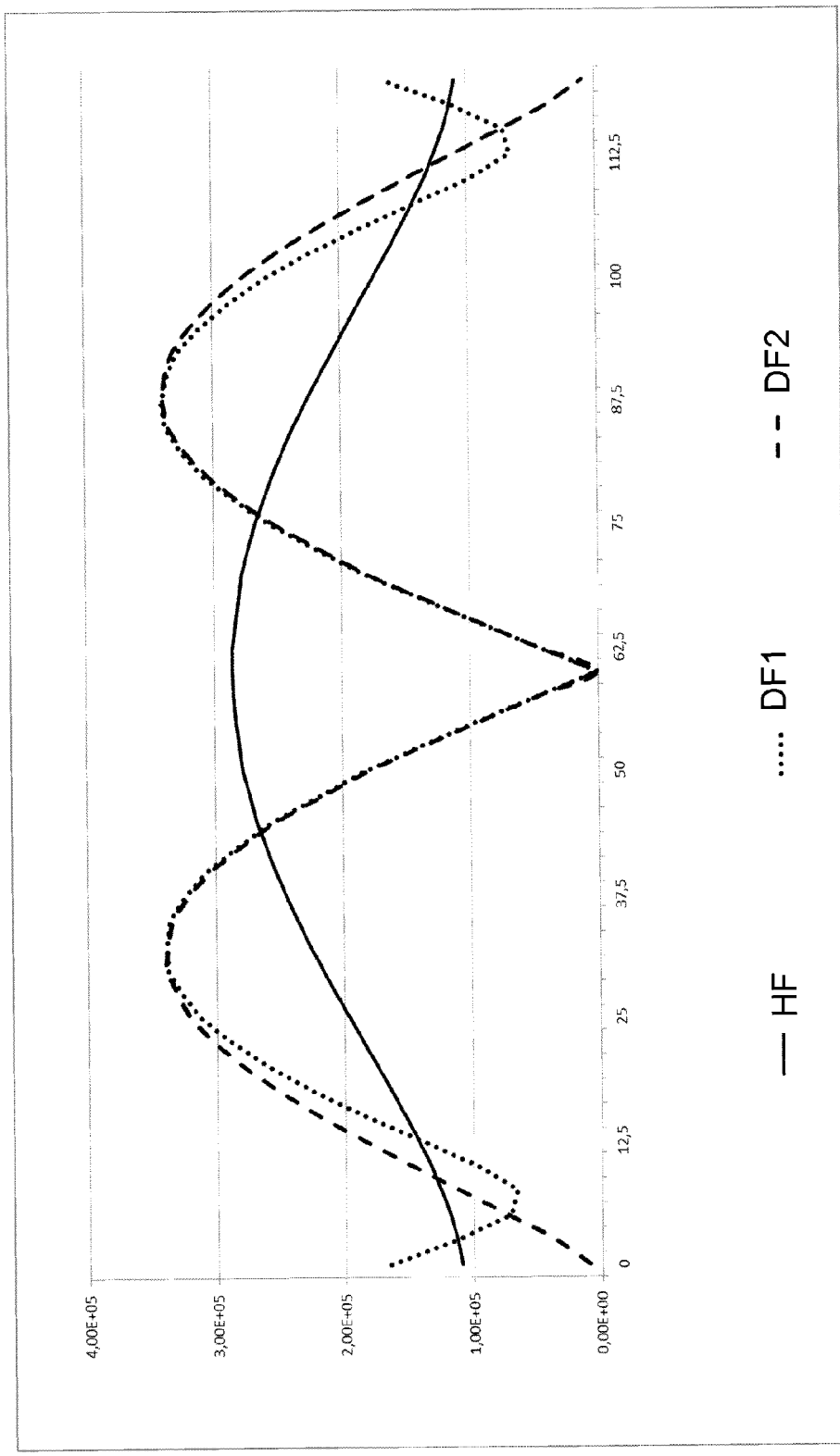
Figure 4:
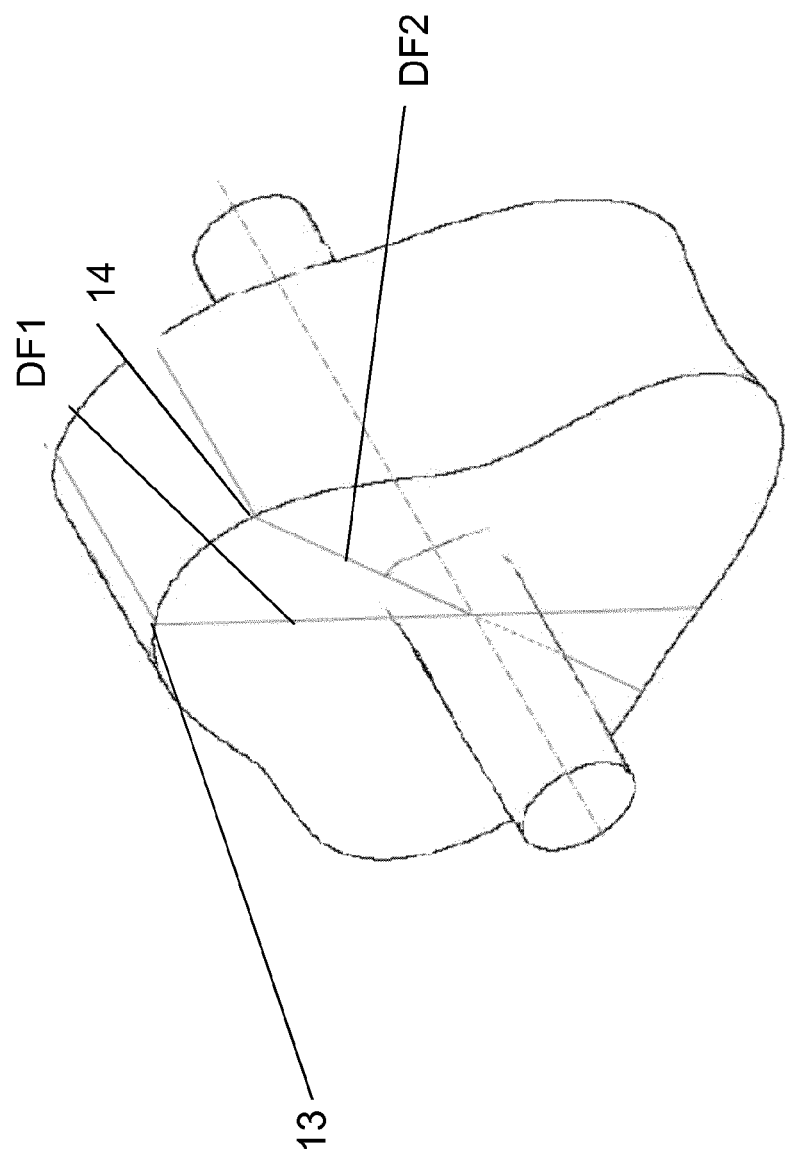
Figure 5A:
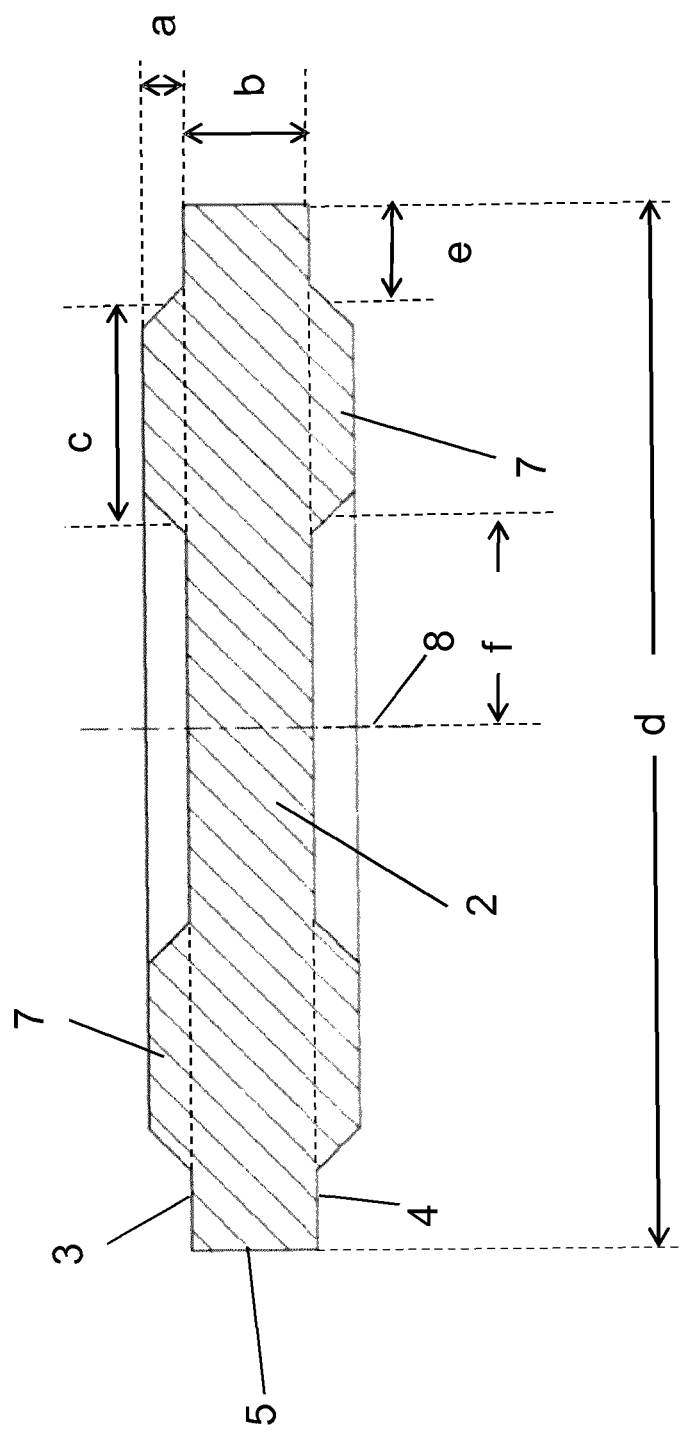
Figure 6A:
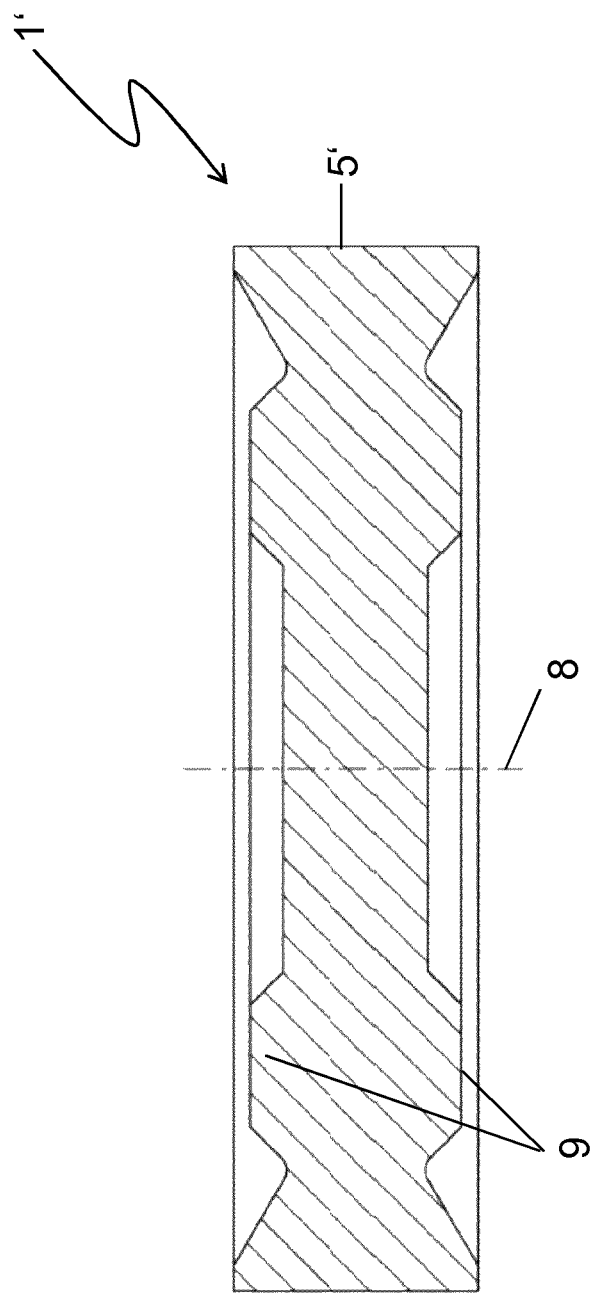
Figure 6B:
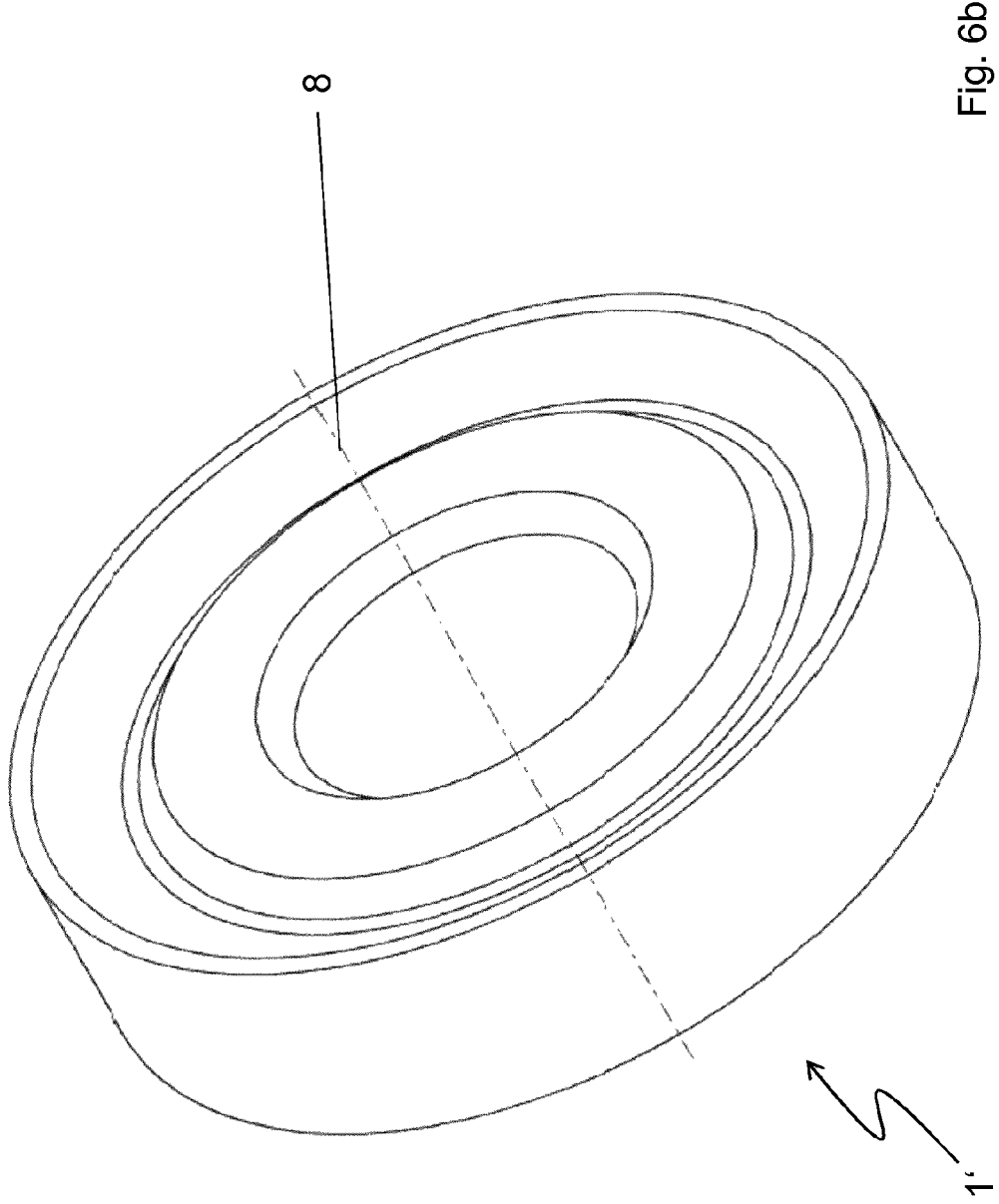

Further advantages, features and possible uses of the present invention will be apparent from the description hereinafter of preferred embodiments. In the drawing:

FIG. 1 shows a diagrammatic view of an ultrasonic processing apparatus according to the state of the art, FIG. 2 shows a diagrammatic view of a triangular mode, FIG. 3 shows a diagrammatic view of the stress pattern within a radially vibrating sonotrode of the state of the art in relation to the position along a diameter, FIG. 4 shows a diagrammatic view of the stress pattern shown in FIG. 3 for the triangular mode, FIGS. 5a and 5b show a sectional view and a perspective view of a first embodiment of the invention, and FIGS. 6a and 6b show a sectional view and a perspective view of a second embodiment of the invention.

FIG. 3 shows the calculated stress in the material within a disk-shaped sonotrode along a section along a diameter for excitation at the main frequency (HF) and along two sections of an excitation at the triangular frequency (DF1, DF2). The calculation was effected for an idealized disk shape. In practice however the sonotrode will have at least axially shaped connecting portions for connection of the converter. However, a qualitatively different stress configuration is not to be expected for the actual form of the sonotrode.

The stress values plotted on the ordinate are specified in random units as the magnitude of the stress is not an important consideration for the present invention, but only the qualitative stress pattern within the sonotrode.

It will be seen that for the main frequency (HF) the stress is lowest in the region of the sealing surfaces and is most greatly pronounced in the direction of the wheel axis which in the present case is at 60 mm. As, upon excitation of the sonotrode with the main frequency, a standing cylindrical wave is produced in the material, with a vibration node on the wheel axis and a vibration maximum on the sealing surface, that is also immediately easy to understand. The sealing surface can vibrate freely so that no stresses worth mentioning occur here while the region directly around the wheel axis scarcely vibrates and is therefore exposed to increased stresses in the material.

As the main frequency is a homogeneous radial vibration, that is to say the welding surface is cylindrical at any moment in time, the stress pattern is also not dependent on the specific arrangement of the section being considered.

That however is not true for the triangular frequency as the welding surface is irregularly deformed. The stress pattern therefore depends on the choice of the section through the sonotrode, as is diagrammatically shown in FIG. 4. The stress pattern along a line (DF1) joining two oppositely disposed vibration maxima 13 differs from the stress pattern along a line (DF2) joining two oppositely disposed vibration minima.

Those stress patterns are also entered in FIG. 3. They differ markedly from the stress pattern of the main frequency. Here the lowest stress, namely a stress of almost zero, is in the region of the wheel axis (60 mm). The stress passes through a maximum in the direction of the sealing surface. In the proximity of the sealing surface the stress pattern is no longer homogeneous in the peripheral direction. In the region of the vibration nodes the stress is almost zero at the sealing surface while it increases in the direction of the vibration maxima.

It will be seen that there are regions which in the illustrated example are between about 10 and 42.5 mm and between 75 and 112.5 mm respectively, in which excitation at the triangular frequency presents a greater material stress than excitation at the main frequency. Therefore in the regions in which the material stress for excitation with the triangular frequency is higher than for excitation with the main frequency the wheel-shaped sonotrode is increased in thickness. Such a thickened portion inevitably leads to a variation in the natural frequency of the sonotrode. By virtue of the selected positioning of the thickened portion however the triangular frequency is varied more greatly than the main frequency.

FIGS. 5a and 5b therefore show a first embodiment according to the invention of a sonotrode 1. FIG. 5b shows a perspective view and FIG. 5a shows a sectional view. This sonotrode comprises a wheel-shaped portion 2 having two main surfaces 3 and 4 which are connected together by way of a peripherally extending sealing surface 5. The sealing surface 5 is of a width b. The wheel-shaped sonotrode 1 is of a diameter d. According to the invention the sonotrode has two thickened portions 6 and 7 on oppositely disposed main surfaces 3, 4. Those thickened portions are each of a rotationally symmetrical configuration relative to the wheel axis 8 and are of a mirror-symmetrical configuration relative to a mirror plane extending perpendicularly to the wheel axis 8.

The thickened portion is of a height a in the axial direction and an extent c in the radial direction.

In the cases in which the thickened portion does not have a flank extending parallel to the wheel axis 8 the radial width c is measured from the points at which the thickened portion reaches half the axial height a. In other words then the width at half the height is established as the width of the thickened portion.

The thickened portion is spaced from the sealing surface 5 by a spacing e which in the illustrated embodiment is about 0.17×d. In addition the thickened portion is spaced from the wheel axis 8 at a spacing f which in the illustrated embodiment is about 0.125×d.

FIGS. 6a and 6b show a second embodiment of a sonotrode. FIG. 6b shows a perspective view and FIG. 6a shows a sectional view. Here account is taken of the fact that wheel-shaped sonotrodes frequently involve a width in the axial direction, that increases in a direction towards the sealing surface 5'. In this case also a clever arrangement of the thickened portion 9 can increase the distance between the triangular frequency and the main frequency.

LIST OF REFERENCES

1 wheel-shaped sonotrode
2 wheel-shaped portion
3, 4 main surfaces
5, 5' sealing surface
6, 7, 9 thickened portion of the sonotrode
8 wheel axis
10 ultrasonic welding installation
11 counterpart tool
12 sonotrode
13 vibration maxima
14 vibration minima
15 material web

The invention claimed is:

1. A sonotrode with a wheel-shaped portion having a wheel axis and of a diameter d, which has two substantially circular main surfaces and a substantially cylindrical sealing surface of the width b, that connects the main surfaces, characterised in that at least one main surface has a non-central thickened portion which in a sectional view perpendicularly to the main surface has a convex region which is not arranged on the wheel axis wherein in the axial direction the thickened portion is of an extent which is between 0.25×b and 2×b.

2. A sonotrode as set forth in claim 1 characterised in that the thickened portion has an apex point or an apex surface to which a tangent extends perpendicularly to the axis.

3. A sonotrode as set forth in claim 1 characterised in that the thickened portion is of a rotationally symmetrical configuration relative to the wheel axis.

4. A sonotrode as set forth in claim 1 characterised in that the thickened portion is arranged spaced from the wheel axis at at least 0.1×d.

5. A sonotrode as set forth in claim 1 characterised in that the thickened portion is arranged spaced from the sealing surface at at least 0.05×d.

6. A sonotrode as set forth in claim 1 characterised in that in the radial direction the thickened portion is of an extent c of at least 0.1×d.

7. A sonotrode as set forth in claim 1 characterised in that the ratio of the width b of the sealing surface to the axial extent a of the thickened portion is at least 0.1.

8. A sonotrode as set forth in claim 1 characterised in that in the axial direction the thickened portion is of an extent which is between 2 mm and 10 mm.

9. A sonotrode as set forth in claim 1 characterised in that a respective thickened portion is arranged at both main surfaces, wherein preferably the thickened portions are arranged symmetrically relative to a plane perpendicular to the wheel axis.

10. A sonotrode as set forth in claim 1 wherein in the axial direction the thickened portion is of an extent which is between 0.25×b and 1×b.

11. A sonotrode as set forth in claim 4 wherein the thickened portion is arranged spaced from the wheel axis at at least 0.15×d.

12. A sonotrode as set forth in claim 5 wherein the thickened portion is arranged spaced from the sealing surface at at least 0.17×d.

13. A sonotrode as set forth in claim 6 wherein in the radial direction the thickened portion is of an extent c of at least 0.2×d.

14. A sonotrode as set forth in claim 13 wherein in the radial direction the thickened portion is of an extent c is between 0.2×d and 0.25×d.

15. A sonotrode as set forth in claim 7 wherein the ratio of the width b of the sealing surface to the axial extent a of the thickened portion is at least 0.5.

* * * * *